United States Patent
Dhepe et al.

(10) Patent No.: US 12,492,176 B2
(45) Date of Patent: Dec. 9, 2025

(54) PROCESS FOR PREPARATION OF 2, 5-FURAN DICARBOXYLIC ACID FROM 5-HYDROXYMETHYL FURFURAL

(71) Applicant: COUNCIL OF SCIENTIFIC & INDUSTRIAL RESEARCH, New Delhi (IN)

(72) Inventors: Paresh Laxmikant Dhepe, Maharashtra (IN); Kalyani Gajananrao Sonone, Maharashtra (IN); Priya Laxmanrao Lokhande, Maharashtra (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 492 days.

(21) Appl. No.: 18/041,458

(22) PCT Filed: Aug. 10, 2021

(86) PCT No.: PCT/IN2021/050766
§ 371 (c)(1),
(2) Date: Feb. 13, 2023

(87) PCT Pub. No.: WO2022/034613
PCT Pub. Date: Feb. 17, 2022

(65) Prior Publication Data
US 2023/0295102 A1 Sep. 21, 2023

(30) Foreign Application Priority Data
Aug. 11, 2020 (IN) .............................. 202011034406

(51) Int. Cl.
| | | |
|---|---|---|
| C07D 307/68 | (2006.01) |
| B01J 23/89 | (2006.01) |
| B01J 29/06 | (2006.01) |
| B01J 37/00 | (2006.01) |
| B01J 37/02 | (2006.01) |
| B01J 37/04 | (2006.01) |
| B01J 37/08 | (2006.01) |

(52) U.S. Cl.
CPC ........ *C07D 307/68* (2013.01); *B01J 23/8986* (2013.01); *B01J 29/06* (2013.01); *B01J 37/0036* (2013.01); *B01J 37/0236* (2013.01); *B01J 37/04* (2013.01); *B01J 37/08* (2013.01); *B01J 2235/00* (2024.01); *B01J 2235/05* (2024.01); *B01J 2235/10* (2024.01); *B01J 2235/15* (2024.01); *B01J 2235/30* (2024.01)

(58) Field of Classification Search
CPC .................................................... C07D 307/68
USPC ........................................................ 549/485
See application file for complete search history.

(56) References Cited

U.S. PATENT DOCUMENTS

| 9,321,744 B1 | 4/2016 | Hsu et al. |
| 2016/0221979 A1 | 8/2016 | Yashiro et al. |

FOREIGN PATENT DOCUMENTS

| CN | 111362892 A | 7/2020 |
| WO | 2015/193364 A1 | 12/2015 |

OTHER PUBLICATIONS

Qingqing Li, et al.; "Selective oxidation of 5-hydroxymethylfurfural to 2,5-furandicarboxylic acid over Au/CeO2 catalysts:the morphology effect of CeO2", Catal. Sci Technol., 2019, 9, 1570-1580.
W. Mamo, et al.; "Comparison of glucose conversion to 5-HMF using different modified mordenites in ionic liquid and biphasic media", Catalysis Science & Technology; 2016, 6; pp. 2766-2774.

*Primary Examiner* — Taofiq A Solola

(57) ABSTRACT

The present invention provides a process for the synthesis of furan dicarboxylic acid (FDCA) from glucose or crude hydroxy methyl furfural (HMF) using mixed metal oxides catalyst. The present invention further provides a process for preparation of the mixed metal oxides catalyst.

11 Claims, 6 Drawing Sheets a. Cu-Mn (1:4)

b. Co-Mn-Ce (1:4:0.25)

c. Co-Mn-Fe (1:4:1)

d. Co-Mn-Fe-Zr (1:4:0.5:0.5)

a. Cu-Mn (1:4)

b. Co-Mn-Ce (1:4:0.25)

c. Co-Mn-Fe (1:4:1)

d. Co-Mn-Fe-Zr

PROCESS FOR PREPARATION OF 2, 5-FURAN DICARBOXYLIC ACID FROM 5-HYDROXYMETHYL FURFURAL

This application is a National Stage of International Application No. PCT/IN2021/050766, filed 10 Aug. 2021, which claims the benefit of Indian Application No. 202011034406, filed 11 Aug. 2021, the entireties of which are hereby incorporated herein by reference.

FIELD OF THE INVENTION

The present invention relates to a process of catalytic oxidation of 5-hydroxymethyl furfural (HMF) to 2, 5-Furan dicarboxylic acid (FDCA). More particularly, the invention provides a process for the synthesis of furan dicarboxylic acid (FDCA) from glucose or crude hydroxy methyl furfural (HMF) using non-noble metal catalyst.

BACKGROUND AND PRIOR ART OF THE INVENTION 5-hydroxymethyl furfural (HMF) derived from cellulose via glucose formation is a very critical compound because of its active functional groups (—CHO and —CH2OH), which can be leveraged to synthesize various industrially important chemicals. HMF can be oxidized under aerobic conditions to yield 2,5-furan dicarboxylic acid (FDCA) which has a potential to replace Purified Terephthalic Acid (PTA) in polymer synthesis. As per the estimates, FDCA production in making PEF (Polyethylene Furanoate) is expected to have highest market potential in future, accounting for over 60% of global FDCA consumption.

Considering the importance of the oxidation of HMF into FDCA, several researchers have demonstrated various catalytic pathways. Traditionally noble metals such as Ru, Pt, Au and Ag have been used for this process, making the process economically unviable, due to concerns of recyclability of these catalysts.

Article titled, "Comparison of glucose conversion to 5-HMF using different modified mordenites in ionic liquid and biphasic media" by W. Mamo et al. published in Catalysis Science & Technology, 2016, 6(8) reports modified mordenites have been used in the direct conversion of glucose into 5-hydroxymethylfurfural (5-HMF) in two different media: the ionic liquid 1-butyl-3-methylimidazolium bromide ([BMIM]Br) and a biphasic system composed of water-acetone and ethyl acetate.

In the prior arts U.S. Pat. No. 9,321,744B1 directly salts of Co (II), Mn (II), Ce (II) and corrosive bromide promoter is used. In the present invention, the inventor has given treatment to salts so as to remove free chlorides, acetates from the solution because these ions hinder the reaction process. The present system is efficient without using any promoter. Moreover, with metal salts system becomes homogeneous and present system by forming mixed metal oxides becomes heterogeneous.

There are various reports available on leaching of Mg from MgO support. However, use of base while preparation of catalyst makes the system tedious and if proper washing is not done then this base contributes in the reaction. MgO is not a stable support under high temperature condition.

In article titled,"Selective oxidation of 5-hydroxymethyl-furfural to 2, 5-furandicarboxylic acid over Au/CeO2 catalysts: the morphology effect of CeO2" by Qingqing Li et al. published in Catal. Sci. Technol., 2019,9, 1570-1580, gold (Au) catalyst is used while in present work, Co, Mn, Cu etc metals have been used. Additionally, Au is very expensive compared to metals. In the present work, ceria (Ce) has been used and have shown its contribution towards reaction.

In this prior art ceria is used only as a support.

Few other reports use dilute substrate solutions, which makes overall process energy intensive. In most of the reports, pure HMF (commercial) is used for the reactions and it is very well known that due to instability of HMF under ambient conditions, it is an economically unsustainable process when it needs to be produced on industrial scale.

Therefore, there is a need or economically viable, industrial scale process for the synthesis of FDCA. Since the economics of the process is affected by the substrate i.e HMF and the catalyst and usually results in poor yields, the inventors have provided a process for synthesis of FDCA resolving all the above-mentioned issues in the prior arts.

Objectives of the Invention:

The main objective of the present invention is to provide a process for the synthesis of 2,5-furan dicarboxylic acid (FDCA) from crude 5-hydroxymethyl furfural (HMF) employing non noble metal catalysts.

Another objective of the present invention is to provide catalysts for synthesis of 2,5-furan dicarboxylic acid (FDCA), which are synthesized by simple processes.

SUMMARY OF THE INVENTION

Accordingly, the present invention provides a process for the synthesis of 2,5-furan dicarboxylic acid (FDCA) from crude 5-hydroxymethyl furfural (HMF) comprising the steps of:
 a) reacting a glucose with a zeolite catalyst in a solvent at a temperature in the range of 165° C.-185° C. for a period of 5-6 hrs to obtain crude 5-hydroxymethyl furfural;
 b) optionally, purifying the crude 5-hydroxymethyl furfural as obtained in step (a) with a solvent by extraction method to obtain pure 5-hydroxymethyl furfural;
 c) reacting the 5-hydroxymethyl furfural as obtained in step (a) or (b) with a mixed metal oxide catalyst in a solvent at a temperature in the range of 120° C.-140° C. for 1-24 hrs under 10-20 bar $O_2$/air pressure in the presence of a base to obtain 2,5-furan dicarboxylic acid.

In another aspect of the invention, selectivity of the 2,5-furan dicarboxylic acid is in the range of 80 to 95% with 50 to 80% of yield; and said crude 5-hydroxymethyl furfural used is with purity in the range from 80-90%.

In another aspect of the invention, the zeolite catalyst used in said process step a) is selected from the group consisting of H-form of Mordenite, Faujasite, Beta zeolite, Mobil-type five and H-form of Zeolite Socony Mobil-5, and H-Beta type having Si/Al or Si/Heteroatom ratios in the range from 1 to 400, wherein the heteroatom is selected from Aluminum, Gallium and Boron.

In another aspect of the invention, the solvent used in said process step (a) or (b) is selected from the group consisting of water, methyl isobutyl ketone, dichloromethane, methyl isobutyl ketone, ethyl acetate, diethyl ether, hexane, tetrahydrofuran, dimethyl sulfoxide, toluene alone or combination thereof.

In another aspect of the invention, the mixed metal oxide catalyst used in said process step c) is selected from mixture of oxides of metals comprising of Cobalt, Cerium, Iron, Vanadium, Copper, Zirconium, Titanium, Lanthanum, Manganese and a mixture thereof, wherein said metals are supported on support selected from Cerium(IV) oxide, activated Carbon, Silicon dioxide, Zirconium dioxide, Aluminum oxide, Titanium dioxide, Magnesium oxide, Calcium oxide, Strontium oxide, Barium oxide, Lanthanum oxide, Samarium(III) oxide, Yttrium oxide, Zinc oxide, Molybdenum trioxide, Thorium dioxide, Zinc oxide-Aluminum oxide, Magnesium oxide-Titanium dioxide, Caesium/Aluminum oxide, Sodium oxide, Potassium oxide, Caesium oxide/Aluminum oxide, Caesium/Silicon dioxide, Caesium oxide/Silicon dioxide, Sodium oxide/Magnesium oxide, hydrotalcite ($Mg_6Al_2(OH)_{16}CO_3 \cdot 4H_2O$), chrysolite ($Mg_3(Si_2O_5)O_3(OH)_4$), sepiolite ($Mg_4Si_6O_{15}(OH)_2$), alkali ion-exchanged zeolites, alkali ion-added zeolites, lanthanide imide and nitride on zeolite, and metal oxynitrides.

In another aspect of the invention, the base used in process step c) is selected from the group consisting of sodium carbonate, sodium bicarbonate, potassium carbonate, potassium bicarbonate, sodium hydroxide and potassium hydroxide.

In yet another aspect of the invention, ratio of the 5-hydroxymethyl furfural: mixed metal oxide catalyst used in said process step c) is in the range of 0.1-10.0.

In yet another aspect of the invention, the amount of said base used in said process step c) is 1-2 molar equivalent to complete 2, 5-furan dicarboxylic acid formation.

In yet another aspect of the invention, the mixed metal oxide catalyst is selected from the group consisting of oxides of Cobalt-Manganese-Cerium, Cobalt-Manganese-Iron, Cobalt-Manganese-Iron-Zirconium and Cobalt-Manganese.

The zeolite catalyst used at step a) is selected from the group comprising of H-form mordenite, faujasite, BEA, MFI, HMOR, HZSM-5, H Beta type having varying Si/Al or Si/Heteroatom ratios can vary from 1 to 400, wherein heteroatoms are selected from Al, Ga, B, which will retain zeolitic framework.

The mixed metal oxide catalyst used at step c) is selected from the oxides of the metal group comprising of Co, Ce, Fe, V, Cu, Zr, Ti, La and Mn. Moreover, these metals also supported on various supports selected from $CeO_2$, Activated Carbon, $SiO_2$, $ZrO_2$, $Al_2O_3$, $TiO_2$, HT, MgO, NaY.

The metal oxides comprising the catalyst are optionally supported on basic supports selected from the group consisting of:
(1) Single component metal oxides
  alkaline earth metal oxides (MgO, CaO, SrO, BaO etc.)
  rare earth oxides ($La_2O_3$, $Sm_2O_3$ etc.)
  other oxides ($Al_2O_3$, $ZrO_2$, $Y_2O_3$, ZnO, $TiO_2$, $MoO_3$, $ThO_2$, etc.)
(2) Double components metal oxide (ZnO—$Al_2O_3$, MgO—$TiO_2$ etc.)
(3) Zeolites
  alkali ion-exchanged zeolites: Na—X, Cs—X (where X stands for zeolite type)
  alkali ion-added zeolites: $Cs_2O$/Cs—X (where X stands for zeolite type) (4) Supported alkali metal compounds
  alkali metal compounds on alumina (Na or K or Cs/$Al_2O_3$, $Na_2O$ or $K_2O$ or $Cs_2O$/$Al_2O_3$ etc.)
  alkali metal compound on silica (Na or K or Cs/$SiO_2$, $Na_2O$ or $K_2O$ or $Cs_2O$/$SiO_2$ etc.)
  alkali metal ions on alkaline earth oxides ($Na_2O$/MgO etc.)
(5) Clay minerals
  hydrotalcite (for e.g. $Mg_6Al_2(OH)_{16}CO_3 \cdot 4H_2O$ with varying metal content)
  chrysolite (for eg. $Mg_3(Si_2O_5)O_3(OH)_4$ with varying metal content)
  sepiolite ($Mg_4Si_6O_{15}(OH)_2$ with varying metal content)
(6) Non-oxide
  KF supported on alumina (for e.g. KF/$Al_2O_3$ etc.)
  lanthanide imide and nitride on zeolite
  metal oxynitrides: ALPON, VALPON etc.

The selectivity of the product 2,5-furan dicarboxylic acid (FDCA) is >80%, preferably 80 to 95% with >50%, preferably 50 to 80% yield.

The HMF used is crude with purity in the range from 80-90%.

Further, the present invention also provides a process for preparing the mixed metal oxide catalyst comprising mixing and grinding metal precursors in the range of 0.1-1 molar ratio in presence of oxalic acid in the range of 0.5-0.75 at a temperature in the range of 25-35° C. for time period of 10-20 minutes to obtain a paste; drying the grinded paste in hot air oven at a temperature in the range of 50° C. to 150° C. for time period of 2-16 hrs followed by calcination at temperature between 300-800° C. in oven for a time period of 1-20 hrs in the presence of air to get the mixed metal oxide catalysts.

In another aspect of the invention, the mixed metal oxide catalyst is synthesized by a simple, green process comprises grinding precursors with oxalic acid in a 1:0.75 ratio at 25-35° C. for 10-20 minutes.

In yet another aspect of the invention, the said precursors used in said process of preparing the mixed metal oxide catalyst are selected from cobalt (II) acetate tetrahydrate, cereous nitrate hexahydrate, ferric nitrate nonahydrate, vanadium (III) chloride, copper (II) nitrate trihydrate, zirconyl nitrate, manganese (II) nitrate tetrahydrate and mixtures thereof.

ABBREVIATIONS USED

HMF: 5-hydroxymethyl furfural
FDCA: 2, 5-Furan dicarboxylic acid
MIBK: Methyl isobutyl ketone
MgO: Magnesium oxide
CaO: Calcium oxide
SrO: Strontium oxide
BaO: Barium oxide
$La_2O_3$: Lanthanum oxide
$Sm_2O_3$: Samarium(III) oxide
$Al_2O_3$: Aluminium oxide
$ZrO_2$: Zirconium dioxide
$Y_2O_3$: Yttrium oxide
ZnO: Zinc oxide
$TiO_2$: Titanium dioxide
$MoO_3$: Molybdenum trioxide
$ThO_2$: Thorium dioxide
$Cs_2O$: Caesium oxide
$Na_2O$: Sodium oxide
$K_2O$: Potassium oxide
$SiO_2$: Silicon dioxide
$Mg_6Al_2(OH)_{16}CO_3 \cdot 4H_2O$: Hydrotalcite
HMOR: H-form of mordenite zeolite in the range of Si/Al ratio can be 1-400
HZSM-5: H-form of ZSM-5 (Zeolite Socony Mobil #5) in the range of 1-400
MFI: Mobil-type five
CeO2: Cerium(IV) oxide
HT: Hydrotalcite
NaY: Sodium form of Y zeolite (faujasite)
$MoO_3$: Molybdenum oxide
$ThO_2$: Thallium oxide ALPON: aluminophosphate oxynitride
VALPON: aluminovanadatephosphate oxynitride
BEA: Beta zeolite

DETAILED DESCRIPTION OF THE INVENTION

Figure 1A:
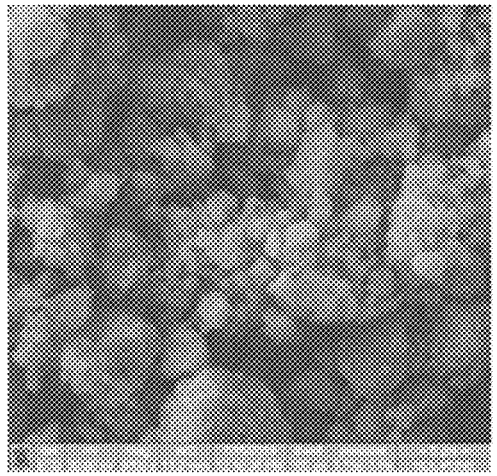
FIG. 1: SEM images of catalyst synthesized

The invention will now be described in detail in connection with certain preferred and optional embodiments, so that various aspects thereof may be more fully understood and appreciated.

In the current invention, the inventors have overcome several drawbacks of prior arts by developing an oxidation reaction in the presence of non-precious metal-based catalysts, which operate under milder conditions and use high substrate concentrations.

Accordingly, to accomplish the objects of the invention, a process for the synthesis of 2, 5-furan dicarboxylic acid (FDCA) from crude 5-hydroxymethyl furfural (HMF) is provided; wherein the process comprising the steps of:
a) synthesizing 5-hydroxymethyl furfural (HMF) from glucose by using a zeolite catalyst in a suitable solvent at a temperature in the range of 165° C.-185° C. for a period of 5-6 hr to afford crude 5-hydroxymethyl furfural (HMF);
b) optionally, purifying the crude 5-hydroxymethyl furfural (HMF) with a suitable solvent obtained at step a) by extraction method to afford pure 5-hydroxymethyl furfural (HMF);
c) reacting the 5-hydroxymethyl furfural (HMF) obtained at step b) with mixed metal oxide catalyst in a solvent at a temperature in the range of 120° C.-140° C. for 1-24 hr under 10-20 bar $O_2$/Air pressure in the presence of a base to afford 2,5-furan dicarboxylic acid (FDCA).

The process of the present invention is depicted below in scheme-1:

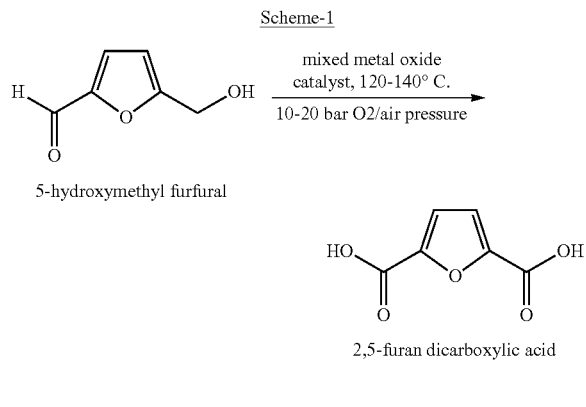

Scheme-1

5-hydroxymethyl furfural 2,5-furan dicarboxylic acid

The zeolite catalyst used at step a) is selected from the group comprising of H-form mordenite, faujasite, beta, MFI, HMOR, HZSM-5, H-Beta type having varying Si/Al or Si/Heteroatom ratioscan vary from 1 to 400, wherein heteroatoms are selected from Al, Ga, B, which will retain zeolite framework.

The suitable solvent used at step a) and step b) may include polar solvent, ketone solvent, ether solvent, ester solvent, non-polar solvent, and mixtures thereof.

Polar solvents may include water, ammonia, sulfuric acid, deuterium oxide, ethanol, methanol, acetone, isopropanol, methyl ethyl ketone, n-propanol, acetonitrile, DMSO, and DMF and mixtures thereof.

Nonpolar solvents may include chloroform, pentane, hexane, benzene, toluene, octane, decane, dimethyl ether, and dichloromethane, and mixtures thereof.

Ketone solvent may include acetone, methyl ethyl ketone, methyl isobutyl ketone, and mixtures thereof.

Ether solvents may include tetrahydrofuran, diethyl ether, 1,4-dioxane, methyl tert-butyl ether, and mixtures thereof.

Ester solvents may include methyl acetate, ethyl acetate, isopropyl acetate, tert-butyl acetate, and mixtures thereof.

The solvent used in step a) is mixture of water and methyl isobutyl ketone in the range of range 0.1:1 to 1:0.1 v/v.

The solvent used in step b) is selected from dichloromethane, methyl isobutyl ketone, ethyl acetate, diethyl ether, hexane, tetrahydrofuran, dimethyl sulfoxide, toluene alone or combination therefrom.

The mixed metal oxide catalyst used at step c) is selected from the oxides of the metal group comprising of Co, Ce, Fe, V, Cu, Zr, Ti, La and Mn. Moreover, these metals also supported on various supports selected from $CeO_2$, Activated Carbon, $SiO_2$, $ZrO_2$, $Al_2O_3$, $TiO_2$, HT, MgO, NaY.

The metal oxides comprising the catalyst are optionally supported on basic supports selected form the group comprising of:
(1) Single component metal oxides
alkaline earth metal oxides (MgO, CaO, SrO, BaO etc.)
rare earth oxides ($La_2O_3$, $Sm_2O_3$ etc.)
other oxides ($Al_2O_3$, $ZrO_2$, $Y_2O_3$, ZnO, $TiO_2$, $MoO_3$, $ThO_2$, etc.)
(2) Double components metal oxide (ZnO—$Al_2O_3$, MgO—$TiO_2$ etc.)
(3) Zeolites
alkali ion-exchanged zeolites: Na—X, Cs—X (where X stands for zeolite type)
alkali ion-added zeolites: $Cs_2O$/Cs—X (where X stands for zeolite type)
(4) Supported alkali metal compounds
alkali metal compounds on alumina (Na or K or Cs/$Al_2O_3$, $Na_2O$ or $K_2O$ or $Cs_2O$/$Al_2O_3$ etc.)
alkali metal compound on silica (Na or K or Cs/$SiO_2$, $Na_2O$ or $K_2O$ or $Cs_2O$/$SiO_2$ etc.)
alkali metal ions on alkaline earth oxides ($Na_2O$/MgO etc.)
(5) Clay minerals
hydrotalcite (for e.g. $Mg_6Al_2(OH)_{16}CO_3 \cdot 4H_2O$ with varying metal content)
chrysolite (for eg. $Mg_3(Si_2O_5)O_3(OH)_4$ with varying metal content)
sepiolite ($Mg_4Si_6O_{15}(OH)_2$ with varying metal content)
(6) Non-oxide
KF supported on alumina (for e.g. KF/$Al_2O_3$ etc.)
lanthanide imide and nitride on zeolite
metal oxynitrides: ALPON, VALPON etc.

The base used at step c) is selected from the group consisting of sodium carbonate, sodium bicarbonate, potassium carbonate, potassium bicarbonate, sodium hydroxide and potassium hydroxide.

In particularly useful embodiment, sodium carbonate is used as a base at step c).

The ratio of HMF:catalyst used at step c) is in the range of 0.1-10.0.

The amount of base used at step c) is 1-2 molar equivalent to complete FDCA formation.

The selectivity of the product 2,5-furan dicarboxylic acid (FDCA) is >80%, preferably 80 to 95% with >50%, preferably 50 to 80% yield.

In an embodiment of the invention, the HMF used is crude with purity in the range from 80-90%.

The mixed metal oxide catalyst is selected from Co—Mn—Ce, Co—Mn—Fe, Co—Mn—Fe—Zr, Cu—Mn.

In an aspect of the invention, the mixed metal oxide catalyst is synthesized by a simple, green process comprises mixing metal precursors in the range of 0.1-1 molar ratio and mixing with oxalic acid varying in the range of 0.5-0.75 at 25-35° C. for 10-20 minutes; drying the grinded paste in hot air oven at 50° C. to 150° C. for 2-16 h followed by calcination at 300-800° C. temperature in oven for a period of 1-20 hr in the presence of air to get mixed metal oxide catalysts.

Here, Oxalic acid was added for making material more porous.

The precursors used are selected from Cobalt (II) Acetate Tetrahydrate, Cerous Nitrate Hexahydrate, Ferric Nitrate Nonahydrate, Vanadium (III) Chloride, Copper (II) Nitrate Trihydrate, Zirconyl Nitrate and Manganese (II) Nitrate Tetrahydrate.

Metal precursors mixed in the range of 0.1-1 molar ratio and mixed with oxalic acid varying in the range of 0.5-0.75. Mixed metal precursor to oxalic acid ratio is 0.1:0.75M.

In a comparative embodiment, supported metal catalysts using noble metals like Ru (0.25 to 3 wt % loading) are prepared by wet impregnation method where mixed metal oxides are used as a support.

In an optional aspect, the catalysts are synthesized by processes selected from sol-gel process or wet impregnation process or incipient wetness method, physical mixture of metal oxides etc.

Several experiments have been conducted with different reaction parameters and by using different mixed metal oxides, solvents etc. Results from those experiments are summarized in the following tables.

TABLE 1

The results obtained by using different mixed metal oxides on crude HMF (80-90%) oxidation.

| Sr. No. | Catalyst (M:M' mol ratio) | Temp. (° C.) | Time (h) | Press. O2 (bar) | FDCA Sel. (%) | HMF Conv. (%) |
|---|---|---|---|---|---|---|
| 1 | Without catalyst | 120 | 6 | 10 | 4 | 90 |
| 2 | Co—Mn (1:4) | 120 | 4 | 10 | 65 | 100 |
| 3 | Co—Mn—Ce | 120 | 4 | 10 | 30 | 78 |
| 4 | (1:4:1) | | 6 | | 53 | 96 |
| 5 | | | 8 | | 52 | 98 |
| 6 | Co—Mn—Ce | 120 | 4 | 10 | 67 | 95 |
| 7 | (1:4:0.25) | | 6 | | 75 | 100 |
| 8 | | 140 | 6 | 6 | 80 | 100 |
| 9 | Co—Mn—Fe | 120 | 4 | 10 | 68 | 95 |
| 10 | (1:4:1) | | 8 | 15 | 78 | 98 |
| 11 | Co—Mn—Fe—Zr | 120 | 4 | 10 | 62 | 95 |
| 12 | (1:4:0.5:0.5) | | 8 | | 67 | 97 |
| 13 | Cu—Mn (1:4) | 120 | 4 | 10 | 75 | 92 |
| 14 | | | 8 | 15 | 90 | 100 |
| 15 | Co—Mn—Zr | 120 | 8 | 10 | 68 | 100 |
| 16 | (1:4:1) | 140 | 6 | 12 | 73 | 100 |
| 17 | Mn—Fe—Cu (4:1:1) | 120 | 6 | 10 | 19 | 97 |
| 18 | Mn—Fe—Ce (4:1:0.25) | 140 | 6 | 6 | 54 | 96 |
| 19 | Co—Cu—Mn (1:1:4) | 120 | 10 | 10 | 42 | 100 |
| 20 | Co—Mn—V (1:4:1) | 120 | 6 | 10 | 2 | 53 |
| 21 | Co—Cu—Mn—Ce (1:1:4:0.25) | 120 | 6 | 10 | 60 | 92 |
| 22 | Co—Cu—Mn—Fe (1:1:4:1) | | | | 62 | 95 |
| 23 | Co—Mn/HT | | | | 52 | 92 |
| 24 | Co—Mn—Ce/HT | | | | 59 | 96 |
| 25 | Cu—Mn—Ce (1:4:0.25) | | | | 49 | 88 |
| 26 | Cu—Mn—Fe—Zr (1:4:1:1) | | | | 54 | 93 |
| 27 | Ru/Co—Mn (1:4) | 120 | 6 | 10 | 75 | 95 |
| 28 | Ru—Co—Mn—Ce (1:4:0.25) | | | | 85 | 100 |
| 29 | Ru—Cu—Mn (1:4) | | | | 83 | 100 |
| 30 | #Ru/Carbon | | 4 | | 93 | 100 |
| 31 | Ru—Co—Mn—Ce/C (1:4:0.25) | | | | 90 | 100 |
| 32 | Co/NG | 120 | 8 | | 35 | 98 |
| 33 | CuOx/MC | 120 | 6 | | 45 | 100 |
| 34 | MnOx—CoOx/MC | 120 | 6 | | 35 | 100 |
| 35 | CuMn/NG | 120 | 8 | | 53 | 100 |

*Reaction condition: 0.5 wt % solution of crude HMF (Purity 80-90%), catalyst (0.5 g), Water (30 mL), Base (Na2CO3: 0.15 g). (MC = Mesoporous carbon, NG = Nitrogen doped graphene)
0.25 g catalyst.
Note:
When solid base is used in the reaction, homogeneous base is not used.

TABLE 2

The data of effect of time on the HMF oxidation reaction.

| Sr. No. | Catalyst (M:M' mol ratio) | Time, (h) | FDCA Selectivity (%) | HMF Conversion (%) |
|---|---|---|---|---|
| 1 | Co—Mn—Ce | 4 | 69 | 83 |
| 2 | (1:4:0.25) | 6 | 80 | 100 |
| 3 | | 8 | 60 | 92 |
| 1 | Co—Mn—Fe | 2 | 38 | 78 |
| 2 | (1:4:1) | 4 | 68 | 95 |
| 3 | | 6 | 73 | 96 |
| 4 | | 8 | 78 | 98 |
| 1 | Co—Mn—Fe—Zr | 4 | 62 | 95 |
| 2 | (1:4:0.5:0.5) | 6 | 65 | 96 |
| 3 | | 8 | 67 | 97 |
| 1 | Cu—Mn | 4 | 82 | 92 |
| 2 | (1:4) | 6 | 85 | 100 |
| 3 | | 8 | 90 | 100 |

*Reaction condition: 0.5 wt % solution of crude HMF (Purity 80-90%), catalyst (0.5 g), Water (30 mL), Base (Na2CO3: 0.15 g), Temperature (120° C.), O2 Pressure (10-15 bar).
Note:
In case of Co—Mn—Ce (1:4:0.25) catalyst, reaction carried out at 6 bar oxygen and 140° C.

TABLE 3

The data of effect of HMF purity on the oxidation. Purification of lab synthesized HMF was done in the lab by solvent extraction technique.

| Sr. No. | Catalyst (M:M' mol ratio) | Purity of HMF (%) | Temperature (°C.) | Time, (h) | Pressure O2 (bar) | FDCA Selectivity (%) |
|---|---|---|---|---|---|---|
| 1 | Co—Mn—Ce | 50 | 120 | 12 | 20 | 50 |
| 2 | (1:4:0.25) | 60 | 120 | 12 | 15 | 51 |
| 3 | | 80 | 120 | 8 | 10 | 78 |
| 4 | | 90 | 140 | 6 | 6 | 80 |
| 5 | | 98 (Commercial sample) | 140 | 6 | 6 | 91 |
| 1 | Co—Mn—Fe | 50 | 140 | 12 | 15 | 56 |
| 2 | (1:4:1) | 60 | 140 | 8 | 15 | 54 |
| 3 | | 80 | 120 | 6 | 10 | 76 |
| 4 | | 90 | 120 | 8 | 15 | 78 |
| 5 | | 98 (Commercial sample) | 120 | 8 | 10 | 37 |
| 1 | Co—Mn—Fe—Zr | 50 | 120 | 12 | 20 | 47 |
| 2 | (1:4:0.5:0.5) | 60 | 120 | 10 | 15 | 52 |
| 3 | | 80 | 120 | 8 | 10 | 54 |
| 4 | | 90 | 120 | 8 | 10 | 67 |
| | | 98 (Commercial sample) | 120 | 6 | 10 | 70 |
| 1 | Cu—Mn | 50 | 120 | 12 | 20 | 53 |
| | (1:4) | 60 | 120 | 12 | 20 | 68 |
| 2 | | 80 | 120 | 8 | 15 | 75 |
| 3 | | 90 | 120 | 8 | 10 | 90 |
| 4 | | 98 (Commercial sample) | 120 | 8 | 15 | 92 |

*Reaction condition: catalyst (0.5 g), solvent (water: 30 mL), Base (Na2CO3: 0.15 g)

TABLE 4

Effect of reaction temperature on the HMF oxidation reaction.

| Sr. No. | Catalyst (M:M' mol ratio) | Temperature (°C.) | Time (h) | Pressure O2 (bar) | FDCA Selectivity (%) |
|---|---|---|---|---|---|
| 1 | Co—Mn—Ce | 100 | 6 | 6 | 19 |
| 2 | (1:4:0.25) | 120 | 6 | 6 | 62 |
| 3 | | 140 | 6 | 6 | 80 |
| 1 | Co—Mn—Fe | 100 | 6 | 10 | 57 |
| 2 | (1:4:1) | 120 | 8 | 15 | 78 |
| 3 | | 140 | 8 | 10 | 68 |
| 1 | Co—Mn—Fe—Zr | 100 | 6 | 15 | 49 |
| 2 | (1:4:0.5:0.5) | 120 | 8 | 10 | 67 |
| 3 | | 140 | 8 | 10 | 56 |
| 1 | Cu—Mn | 100 | 6 | 15 | 75 |
| 2 | (1:4) | 120 | 8 | 15 | 90 |
| 3 | | 140 | 8 | 15 | 80 |

*Reaction condition: 0.5 wt % solution of crude HMF (Purity 80-90%), catalyst (0.5 g), solvent (water: 30 mL), Base (Na2CO3: 0.15 g).

TABLE 5

Recyclability of the catalyst is studied by conducting several experiments.

| Sr. No. | Catalyst (M:M' mol ratio) | Run No. | Time, (h) | FDCA Selectivity (%) |
|---|---|---|---|---|
| 1 | Co—Mn—Ce | 1 | 6 | 80 |
| 2 | (1:4:0.25) | 2 | 6 | 61 |
| 3 | | 3 | 6 | 50 |
| 4 | | 4 | 6 | 48 |
| 1 | Co—Mn—Fe | 1 | 8 | 78 |
| 2 | (1:4:1) | 2 | 8 | 78 |
| 3 | | 3 | 8 | 74 |
| 4 | | 4 | 8 | 73 |
| 1 | Co—Mn—Fe—Zr | 1 | 8 | 67 |
| 2 | (1:4:0.5:0.5) | 2 | 8 | 63 |
| 3 | | 3 | 8 | 63 |
| 4 | | 4 | 8 | 61 |
| 1 | Cu—Mn | 1 | 8 | 90 |
| 2 | (1:4) | 2 | 8 | 62 |
| 3 | | 3 | 8 | 55 |
| 4 | | 4 | 8 | 51 |

*Reaction condition: 0.5 wt % solution of crude HMF (Purity 80-90%), catalyst (0.5 g), solvent (water: 30 mL), Base (Na2CO3: 0.15 g), Temperature (120° C.), Pressure (10-15 bar).
Note:
In case of Co—Mn—Ce (1:4:0.25) catalyst, reaction carried at 6 bar oxygen and 140° C.

TABLE 6

The results obtained by HMF concentration study.

| Sr. No. | Catalyst (M:M' mol ratio) | HMF concentration (wt %) | Time, (h) | FDCA Selectivity (%) |
|---|---|---|---|---|
| 1 | Co—Mn—Ce | 0.5 | 6 | 80 |
| 2 | (1:4:0.25) | 2.0 | 6 | 72 |
| 3 | | 5.0 | 6 | 63 |
| 4 | | 10.0 | 6 | 48 |
| 5 | | 20.0 | 6 | 33 |
| 1 | Co—Mn—Fe | 0.5 | 8 | 78 |
| 2 | (1:4:1) | 2.0 | 8 | 71 |
| 3 | | 5.0 | 8 | 59 |
| 4 | | 10.0 | 8 | 43 |
| 5 | | 20.0 | 8 | 39 |
| 1 | Co—Mn—Fe—Zr | 0.5 | 8 | 67 |
| 2 | (1:4:0.5:0.5) | 2.0 | 8 | 48 |
| 3 | | 5.0 | 8 | 42 |
| 4 | | 10.0 | 8 | 33 |
| 5 | | 20.0 | 8 | 35 |
| 1 | Cu—Mn | 0.5 | 8 | 90 |
| 2 | (1:4) | 2.0 | 8 | 75 |
| 3 | | 5.0 | 8 | 60 |
| 4 | | 10.0 | 8 | 53 |
| 5 | | 20.0 | 8 | 40 |

*Reaction condition: Crude HMF (Purity 80-90%), catalyst (0.5 g), solvent (water: 30 mL), Base (Na2CO3: 0.15 g), Temperature (120° C.), Pressure (10-15 bar).
Note:
In case of Co—Mn—Ce (1:4:0.25) catalyst, reaction carried at 6 bar oxygen and 140° C.

TABLE 7

The results obtained by study experiments to check effect of O2 and air oxidants against HMF purity.

| Sr. No. | Catalyst (M:M' mol ratio) | Purity of HMF (%) | Pressure (bar) | Time, (h) | FDCA Selectivity (%) |
|---|---|---|---|---|---|
| 1 | Co—Mn—Ce | 90 | O2 (6) | 6 | 80 |
| 2 | (1:4:0.25) | 90 | Air (15) | 6 | 77 |
| 3 | | 98 | O2 (6) | 6 | 91 |
| 4 | | 98 | Air (15) | 6 | 80 |
| 1 | Co—Mn—Fe | 90 | O2 (15) | 8 | 78 |
| 2 | (1:4:1) | 90 | Air (20) | 8 | 79 |
| 3 | | 98 | O2 (10) | 8 | 87 |
| 4 | | 98 | Air (20) | 8 | 82 |
| 1 | Co—Mn—Fe—Zr | 90 | O2 (10) | 8 | 67 |
| 2 | (1:4:0.5:0.5) | 90 | Air (15) | 8 | 62 |
| 3 | | 98 | O2 (10) | 8 | 75 |

TABLE 7-continued

The results obtained by study experiments to check effect of $O_2$ and air oxidants against HMF purity.

| Sr. No. | Catalyst (M:M' mol ratio) | Purity of HMF (%) | Pressure (bar) | Time, (h) | FDCA Selectivity (%) |
|---|---|---|---|---|---|
| 4 |  | 98 | Air (15) | 8 | 73 |
| 1 | Cu—Mn | 90 | O2 (15) | 8 | 90 |
| 2 | (1:4) | 90 | Air (20) | 8 | 86 |
| 3 |  | 98 | O2 (10) | 8 | 92 |
| 4 |  | 98 | Air (20) | 8 | 93 |

*Reaction condition: 0.5 wt % solution of crude HMF, catalyst (0.5 g), solvent (water: 30 mL), Base ($Na_2CO_3$: 0.15 g), Temperature (120° C.).
Note:
In case of Co—Mn—Ce (1:4:0.25) catalyst, reaction carried at 6 bar oxygen and 140° C.

Reactions were also carried out in fixed bed reactor in a continuous mode with the employment of following reaction conditions:

Substrate solution: 1 wt % HMF solution in water
Flow: 1 mL/min
Catalyst loading: 1 g
Temperature: 150° C.
Oxygen pressure: 15 bar
Conversion of HMF: 73%
Yield of FDCA: 50%

EXAMPLES

Following examples are given by way of illustration therefore should not be construed to limit the scope of the invention.

Example 1: Preparation of Mixed Metal Oxide Catalyst Co—Mn—Ce (1:4:0.25) M: M: M Ratio Typical synthesis procedure: added Cobalt (II) Acetate Tetrahydrate, Manganese (II) Nitrate Tetrahydrate and Cerous Nitrate Hexahydrate with molar ratio (1:4:0.25 M) given precursors mixed thoroughly and grind with the help of mortar-pestle till fine textured formation seen. Oxalic acid is added to desired precursor in 1:0.75M ratio and manually grind at 27° C. for 20 min. Here, Oxalic acid was added for making material more porous. Then, the grinded paste was subjected for drying in hot air oven at 60° C. for 16 h. After complete drying of powder, it was calcined at 300° C. for 3 hours in oven in presence of air to get mixed metal oxide catalysts denoted as Co—Mn—Ce.

Example 2: Preparation of Mixed Metal Oxide Catalyst Co—Mn—Fe: (1:4:1) M:M:M Ratio Typical synthesis procedure added Cobalt (II) Acetate Tetrahydrate, Manganese (II) Nitrate Tetrahydrate and Ferric Nitrate Nonahydrate with molar ratio (1:4:1 M) given precursors mixed thoroughly and grind with the help of mortar-pestle till fine textured formation seen. Oxalic acid is added to desired precursor in 1:0.75M ratio and manually grind at 27° C. for 20 min. Here, Oxalic acid was added for making material more porous. Then, the grinded paste was subjected for drying in hot air oven at 60° C. for 16 h. After complete drying of powder, it was calcined at 300° C. for 3 hours in oven in presence of air to get mixed metal oxide catalysts denoted as Co—Mn—Fe.

Example 3: Preparation of Mixed Metal Oxide Catalyst Co—Mn—Fe—Zr (1:4:0.5:0.5) M:M:M:M Ratio Typical synthesis procedure added Cobalt (II) Acetate Tetrahydrate, Manganese (II) Nitrate Tetrahydrate, Ferric Nitrate Nonahydrate and Zirconyl Nitrate with molar ratio (1:4:0.5:0.5 M) mixed thoroughly and grind with the help of mortar-pestle till fine textured formation seen.
Oxalic acid is added to desired precursor in 1:0.75M ratio and manually grind at 27° C. for 20 min. Here, Oxalic acid was added for making material more porous. Then, the grinded paste was subjected for drying in hot air oven at 60° C. for 16 h. After complete drying of powder, it was calcined at 300° C. for 3 hours in oven in presence of air to get mixed metal oxide catalysts denoted as Co—Mn—Fe—Zr.

Example 4: Preparation of Mixed Metal Oxide Catalyst Cu—Mn: (1:4) M:M Ratio

Typical synthesis procedure added Copper (II) Nitrate Trihydrate and Manganese (II) Nitrate Tetrahydrate with molar ratio (1:4 M) given precursors mixed thoroughly and grind with the help of mortar-pestle till fine textured formation seen. Oxalic acid is added to desired precursor in 1:0.75M ratio and manually grind at 27° C. for 20 min. Here, Oxalic acid was added for making material more porous. Then, the grinded paste was subjected for drying in hot air oven at 60° C. for 16 h. After complete drying of powder, it was calcined at 500° C. for 17 hoursin oven in presence of air to get mixed metal oxide catalysts denoted as Cu—Mn.

Catalyst Characterization
Scanning Electron Microscopy

Figure 1B:
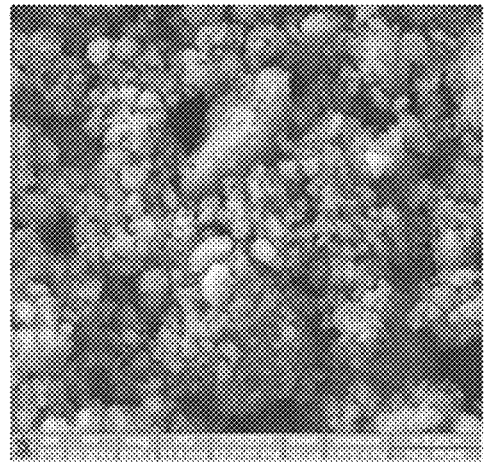
Figure 1C:
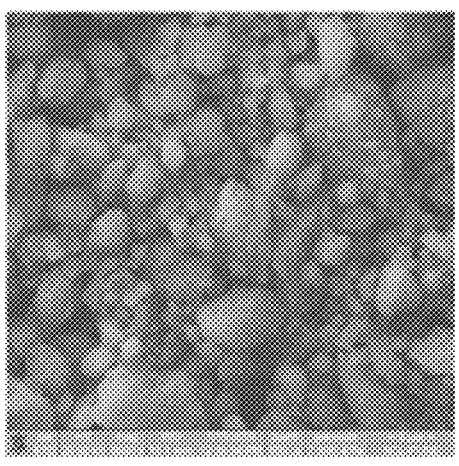
Figure 1D:
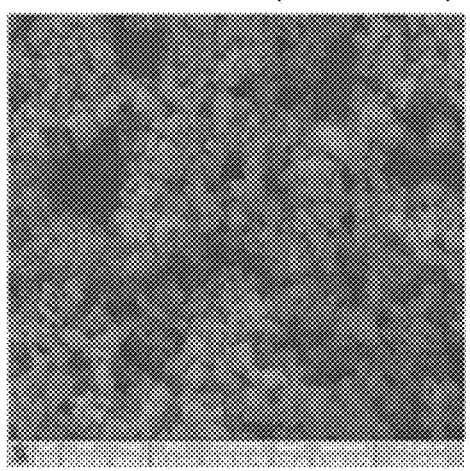

Scanning electron micrograph images (FIG. 1) show the morphology of prepared samples. Catalyst Co—Mn—Ce (1:4:0.25) (FIG. 1b) and Co—Mn—Fe—Zr (1:4:0.5:0.5) (FIG. 1d) shows agglomerated particles. Spherical and rounded shape particles are seen in case of Cu—Mn (FIG. 1a) mixed oxides while flake shaped particles are observed in case of Co—Mn—Fe mixed oxide (FIG. 1c).

Transmission Electron Microscopy

Figure 2A:
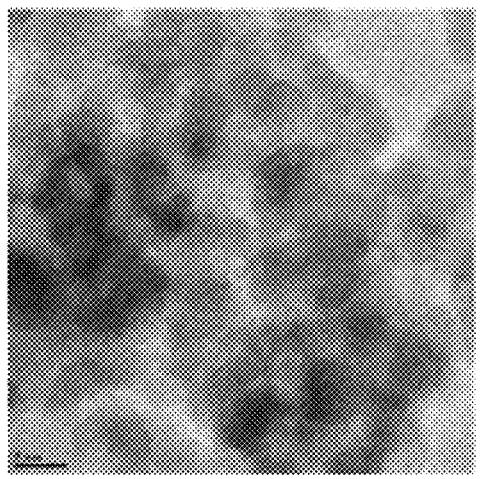
FIG. 2: TEM images of catalyst synthesized
Figure 2B:
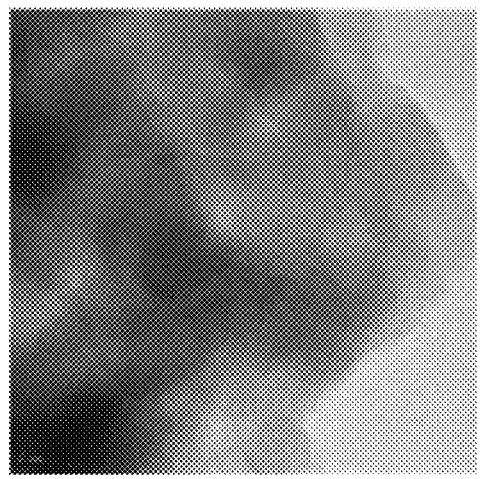

TEM images (FIG. 2) show the morphological properties of Co—Mn—Ce (1:4:0.25) and Cu—Mn (1:4) (FIG. 2a). It has been clearly seen the particle lattice fringes in case of Co—Mn—Ce (FIG. 2b). The segregated particles with fringes are clearly visible in case of Cu—Mn (1:4) mixed oxide catalyst. All the synthesized catalysts were analysed by TEM and showed lattice fringes.

XRD Patterns for Synthesized Catalysts.

Figure 3A:
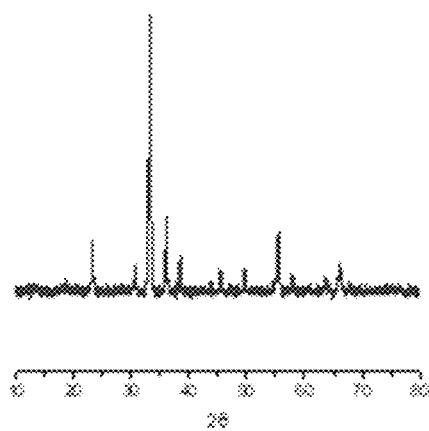
FIG. 3: XRD patterns for synthesized catalysts
Figure 3B:
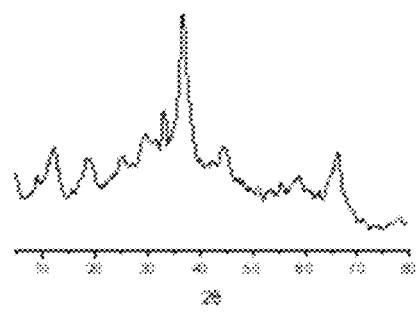

The XRD pattern (FIG. 3) of Cu—Mn (1:4) (FIG. 3a) shows the characteristic peaks of the spinel $CuMn2O4$. Traces of CuO were also detected in the XRD pattern. Peaks for MnOx, along with $Mn3O4$ also has major contribution.

In case of Co—Mn—Ce (1:4:0.25) (FIG. 3b) the XRD pattern showed diffraction peaks of $CeO_2$ at 2θ=(28.6°, 33.1°, 47.6° and 56.5°). Peaks at 59.120 (222), 69.490 (400), and 76.820 (331) also contributes to $CeO_2$. High intense peak of $Mn_3O_4$ has seen at 2θ=36.1°.

Figure 3C:
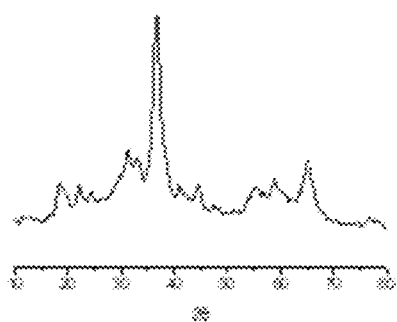
Figure 3D:
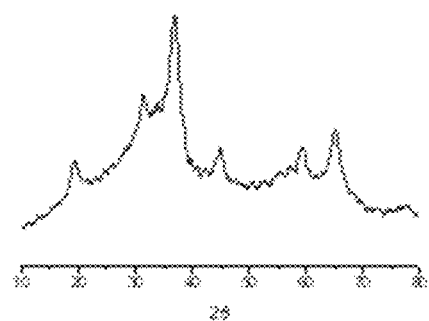
Figure 4:
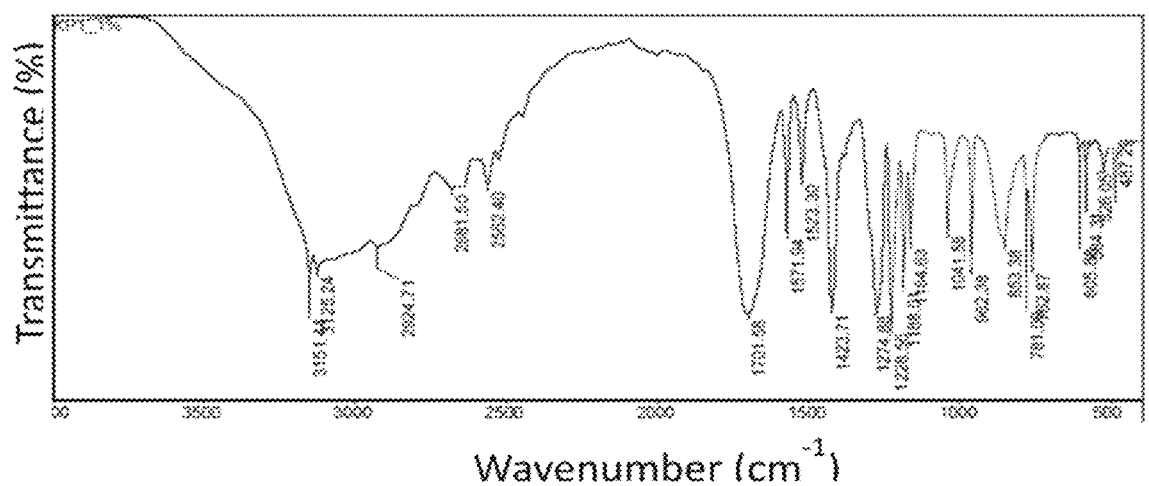
FIG. 4: FT-IR spectrum for FDCA; FT-IR (v, cm-1): 3151, 3125 (—OH); 1701 (C=O); 1572, 1424 (C=C); 1276, 1229 (C—O); 962, 852, and 763 (=CH) groups respectively.
Figure 5:
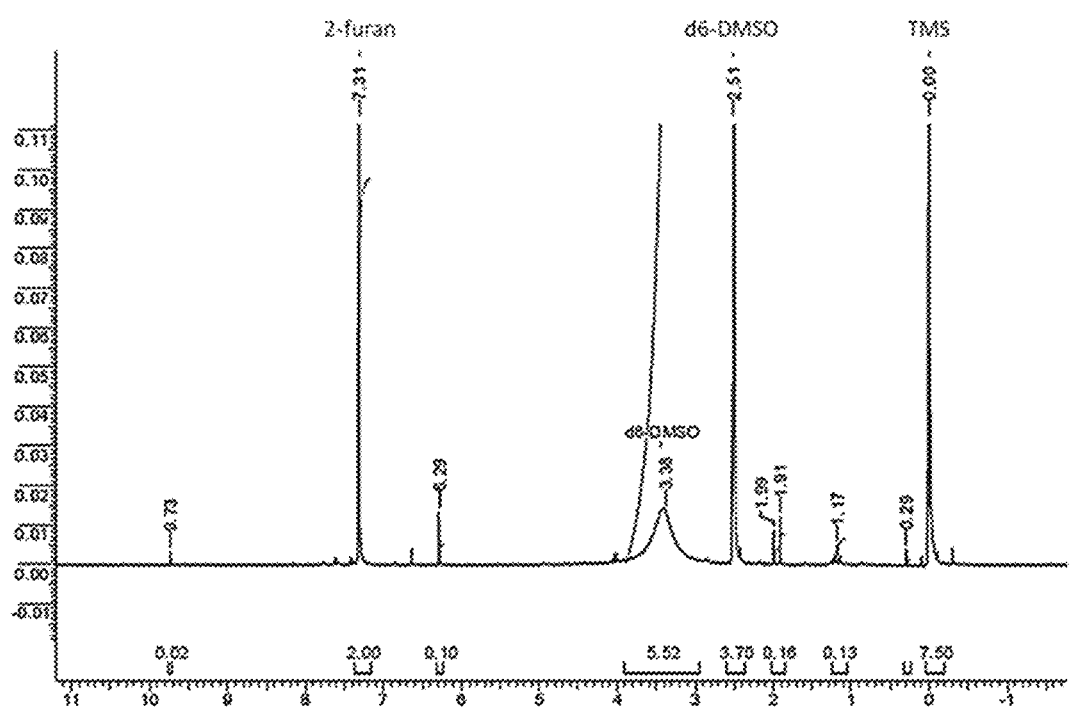
FIG. 5: $^1$HNMR (δ/ppm) spectrum for FDCA
Figure 6:
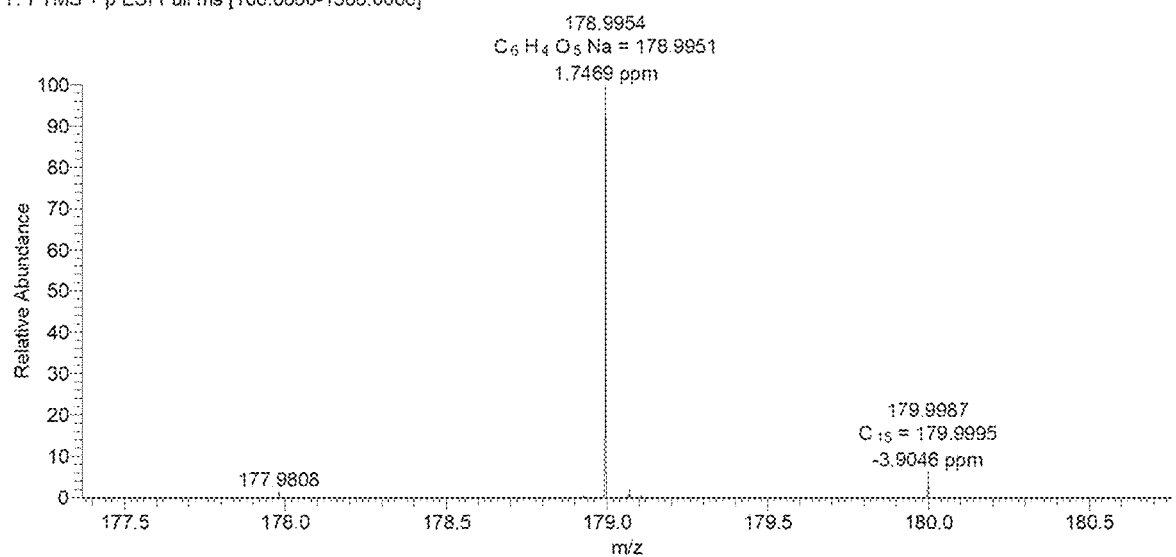
FIG. 6: High Resolution Mass Spectroscopy analysis for FDCA.

FIGS. 3c and 3d of Co—Mn—Fe (1:4:1) and Co—Mn—Fe—Zr, respectively clearly show the diffraction pattern of various phases like $Fe_2O_3$, $Fe_3O_4$, $Co_3O_4$, $CoFe_2O_4$, $Mn_2O_3$, $CoMnO_4$, $CoMnO_3$. From the data obtained, it seems reasonable to see the peak of tetragonal $ZrO_2$ at 2θ=30.2°, 35.2°, 50.3,60.2° and 62.8°.

$Fe_2O_3$, 2θ=18°, 30.5°, 36°,49°,54° and 62.5°
$Fe_3O_4$ (Cubic), 2θ=18°, 30.5°, 36°,54° and 62.5°
$Co_3O_4$ (Cubic), 2θ=33.5°, 38.5°, 41°, 540

CoFe$_2$O$_4$(Cubic), 2θ=30.5°, 36°, 41°, 62.5°
Mn$_2$O$_3$(Cubic), 2θ=18°,33.5°, 36°, 41°,54°
CoMnO$_4$ (Cubic), 2θ=38.5°, 61°, 62.5°
CoMnO$_3$ (rhombohedral), 2θ=41°, 54°, 65°.

Example 5: Synthesis of Crude HMF

Reactions were carried out in a batch mode reactor, with glucose or starch (10 wt % with respect to water) as a substrate in the presence of HMOR (H-form mordenite) catalyst (0.143 g) at 1750° C. for 6 h. Water: methyl isobutyl ketone (MIBK) (1:5 v/v) was used as solvent (30 mL) and 41% yield of HMF with 53% selectivity and 77% HMF conversion was achieved.

Example 6: Purification of HMF

A 20 g of reaction mixture (HMF in organic solvent) was taken and solvent was evaporated to obtain semi-solid mass containing HMF. Water was added to this semi-solid mass and subsequently extraction of HMF with aforesaid solvent was done. If required to achieve higher purity of HMF, repeated extraction procedures were carried out to get highly purified 5-HMF (~purity±90%).

Example 7: Synthesis of FDCA

In a batch mode reactor, 5-hydroxymethyl furfural (HMF), Solvent (Water) and catalyst (different mixed metal oxide) were added. Reactor was flushed and pressurized with O$_2$/Air and desired pressure was filled. Then reaction mixture was stirred at desired temperature for definite time. Reactions are done in the temperature range of 120° C. for 8 h using 10-20 bar O$_2$/Air pressure. The reaction mixture was centrifuged and filtered through 0.22 µm filter and analysed using HPLC equipped with a HC-75 H+column (300*7.8 mm) and refractive index detector.

Advantages of the Invention

Precious metals (like Au, Pt, Ag, etc.) avoided.
New combination of catalysts employed.
Lesser amounts of pressure required.
Crude HMF used.
Economically significant.
Environmental friendly process which avoids use of solvent, organic and mineral aids and mineral bases

We claim:
1. A process for synthesis of 2, 5-furan dicarboxylic acid from crude 5-hydroxymethyl furfural, the process comprising the steps of:
a) reacting a glucose with a zeolite catalyst in a solvent at a temperature in the range of 165° C.-185° C. for a period of 5-6 hrs to obtain crude 5-hydroxymethyl furfural;
b) optionally, purifying the crude 5-hydroxymethyl furfural as obtained in step (a) with a solvent by extraction method to obtain pure 5-hydroxymethyl furfural;
c) reacting the 5-hydroxymethyl furfural as obtained in step (a) or (b) with a mixed metal oxide catalyst in a solvent at a temperature in the range of 120° C.-140° C. for 1-24 hrs under 10-20 bar O$_2$/air pressure in the presence of a base to obtain 2,5-furan dicarboxylic acid.
2. The process as claimed in claim 1, wherein selectivity of the 2,5-furan dicarboxylic acid is in the range of 80 to 95% with 50 to 80% of yield; and wherein said crude 5-hydroxymethyl furfural used is with purity in the range from 80-90%.
3. The process as claimed in claim 1, wherein said zeolite catalyst used in step a) is selected from the group consisting of H-form of Mordenite, Faujasite, Beta zeolite, Mobil-type five and H-form of Zeolite Socony Mobil-5, and H-Beta type having Si/Al or Si/Heteroatom ratios in the range from 1 to 400, wherein the heteroatom is selected from Aluminum, Gallium and Boron.
4. The process as claimed in claim 1, wherein said solvent of step (a) or (b) is selected from the group consisting of water, methyl isobutyl ketone, dichloromethane, methyl isobutyl ketone, ethyl acetate, diethyl ether, hexane, tetrahydrofuran, dimethyl sulfoxide, toluene alone or combination thereof.
5. The process as claimed in claim 1, wherein said mixed metal oxide catalyst used in step c) is selected from mixture of oxides of metals comprising of Cobalt, Cerium, Iron, Vanadium, Copper, Zirconium, Titanium, Lanthanum, Manganese and a mixture thereof, wherein said metals are supported on support selected from Cerium (IV) oxide, activated Carbon, Silicon dioxide, Zirconium dioxide, Aluminum oxide, Titanium dioxide, Magnesium oxide, Calcium oxide, Strontium oxide, Barium oxide, Lanthanum oxide, Samarium (III) oxide, Yttrium oxide, Zinc oxide, Molybdenum trioxide, Thorium dioxide, Zinc oxide-Aluminum oxide, Magnesium oxide-Titanium dioxide, Caesium/Aluminum oxide, Sodium oxide, Potassium oxide, Caesium oxide/Aluminum oxide, Caesium/Silicon dioxide, Caesium oxide/Silicon dioxide, Sodium oxide/Magnesium oxide, hydrotalcite (Mg$_6$Al$_2$(OH)$_{16}$CO$_3$·4H$_2$O), chrysolite (Mg$_3$(Si$_2$O$_5$)O$_3$(OH)$_4$), sepiolite (Mg$_4$Si$_6$O$_{15}$(OH)$_2$, alkali ion-exchanged zeolites, alkali ion-added zeolites, lanthanide imide and nitride on zeolite, and metal oxynitrides.
6. The process as claimed in claim 1, wherein said base used in step c) is selected from the group consisting of sodium carbonate, sodium bicarbonate, potassium carbonate, potassium bicarbonate, sodium hydroxide and potassium hydroxide.
7. The process as claimed in claim 1, wherein ratio of the 5-hydroxymethyl furfural: mixed metal oxide catalyst used in step c) is in the range of 0.1-10.0.
8. The process as claimed in claim 1, wherein amount of said base used in step c) is 1-2 molar equivalent to complete 2, 5-furan dicarboxylic acid formation.
9. The process as claimed in claim 1, wherein the mixed metal oxide catalyst is selected from the group consisting of oxides of Cobalt-Manganese-Cerium, Cobalt-Manganese-Iron, Cobalt-Manganese-Iron-Zirconium and Cobalt-Manganese.
10. A process for preparing the mixed metal oxide catalyst as claimed in claim 1, comprising mixing and grinding metal precursors in the range of 0.1-1 molar ratio in presence of oxalic acid in the range of 0.5-0.75 at a temperature in the range of 25-35° C. for time period of 10-20 minutes to obtain a paste; drying the grinded paste in hot air oven at a temperature in the range of 50° C. to 150° C. for time period of 2-16 hrs followed by calcination at temperature between 300-800° C. in oven for a time period of 1-20 hrs in the presence of air to get the mixed metal oxide catalysts.
11. The process as claimed in claim 9, wherein said precursors used are selected from cobalt (II) acetate tetrahydrate, cereous nitrate hexahydrate, ferric nitrate nonahy- drate, vanadium (III) chloride, copper (II) nitrate trihydrate, zirconyl nitrate, manganese (II) nitrate tetrahydrate and mixtures thereof.

* * * * *